United States Patent [19]

Abe et al.

[11] Patent Number: 5,725,333
[45] Date of Patent: Mar. 10, 1998

[54] SPIRAL END MILL AND METHOD OF MANUFACTURING THE SAME

[75] Inventors: Makoto Abe; Yuichiro Kohno, both of Hyogo; Nobuo Yasuhira; Shuji Ueda, both of Osaka; Kiyoji Aburaya, Shiga-ken; Seiji Nakatani; Makoto Kawanishi, both of Osaka, all of Japan

[73] Assignees: Sumitomo Electric Industries, Ltd., Osaka; Matsushita Electric Industrial Co., Ltd., Kadoma, both of Japan

[21] Appl. No.: 626,476

[22] Filed: Apr. 2, 1996

[30] Foreign Application Priority Data

Apr. 6, 1995 [JP] Japan .................................. 7-081046

[51] Int. Cl.⁶ ..................................................... B23C 5/10
[52] U.S. Cl. ............................. 407/54; 407/63; 407/118
[58] Field of Search ................................. 407/53, 54, 63, 407/118, 119

[56] References Cited

U.S. PATENT DOCUMENTS

| | | | |
|---|---|---|---|
| 5,049,009 | 9/1991 | Beck et al. | 407/54 |
| 5,226,760 | 7/1993 | Nishimura | 407/54 |

FOREIGN PATENT DOCUMENTS

| | | |
|---|---|---|
| 0695596 | 2/1996 | European Pat. Off. . |
| 265097 | 2/1989 | German Dem. Rep. . |
| 932572 | 7/1963 | United Kingdom . |
| WO 94/08745 | 4/1994 | WIPO . |

*Primary Examiner*—Steven C. Bishop
*Attorney, Agent, or Firm*—W. G. Fasse; W. F. Fasse

[57] ABSTRACT

A spiral end mill which can mill a substantially sharp inside corner of a work surface and attain a stable working accuracy for a long time. The spiral end mill has a hard sintered compact insert portion, a negative relief face a first circular land provided along the outer periphery of the insert portion, and a second circular land on the negative relief face so as to be continuous with the first circular land. The widths of the two circular lands may be the same as or different from each other, and the helix angle of a back line of the second circular land is less than that of the first circular land. A method of manufacturing the spiral end mill involves machining a relief angle in the outer periphery of the insert portion while changing the helix angle between the negative relief face and the rest of the outer periphery.

17 Claims, 8 Drawing Sheets

FIG. 4 PRIOR ART
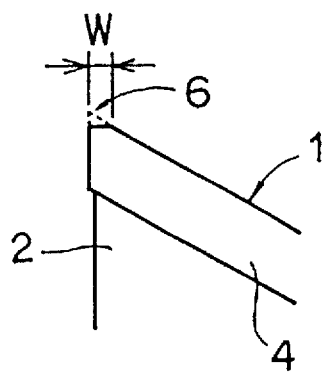
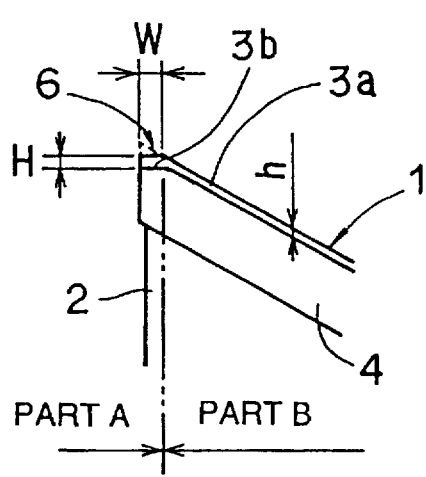
FIG. 5A
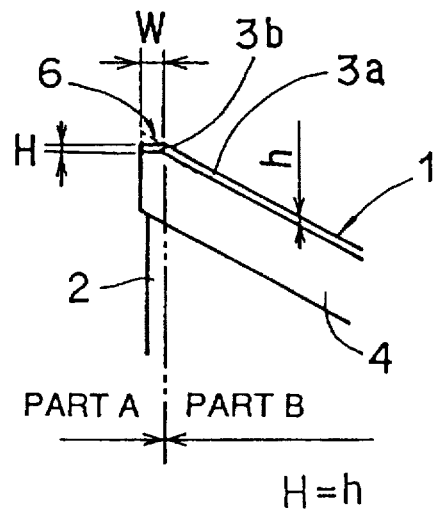
FIG. 5B
H = h 5,725,333

SPIRAL END MILL AND METHOD OF MANUFACTURING THE SAME

BACKGROUND OF THE INVENTION

1. Field of the Invention

The present invention relates to a spiral end mill and a method of manufacturing the same, and more specifically, it relates to a spiral end mill comprising a hard sintered compact which is arranged on an insert portion of the spiral end mill and a negative relief face having a chamfer for reducing the angle of an axial rake which is provided on the forward end of the insert portion, and a method of manufacturing the same.

2. Description of the Background Art

A spiral end mill made of cemented carbide or high-speed steel, which may be coated with a ceramic material on its surface, is known and has been employed in general. However, such a material is so insufficient in wear resistance that it is difficult to maintain stable working accuracy over a long time. Particularly in the case of stage working for working bottom and side surfaces of a workpiece at the same time, a tool corner portion is extremely worn in the conventional tool material to consequently reduce the tool life when the radius (R) of the corner portion is defined to be not more than 0.2 mm, for example. Therefore, employment of a spiral end mill having an insert portion made of a hard sintered compact which is excellent in wear resistance is proposed.

In case of the spiral end mill, its sharpness is improved as the helix angle is increased, while the wedge angle of a front edge is disadvantageously reduced and sharpened. In this specification of the present application, the term "wedge angle" is defined as follows.

"Wedge Angle" =90°—("Helix Angle" +"Relief Angle")

When a spiral end mill having an insert portion made of a hard sintered compact which is less tough than the conventional material is set at a high helix angle of 15° to 45°, for example, the front edge is easily chipped. In order to prevent the front edge from chipping in this case, it is proposed to provide a negative relief face having a chamfer of at least 0.1 mm in width, for example, for reducing the helix angle by approximating an axial rake to 0°, for example. The width and angle of the negative relief face are set in response to the cutting conditions etc.

When such a negative relief face is provided, however, the tool diameter is reduced in a portion subjected to front return if no circular land is formed on the peripheral cutting edge. When stage working is performed, the shape of the cutting edge is transferred to the work surface, which therefore damages the shape of a corner portion of the work surface. Particularly, this leads to inconvenience in applications requiring a shape close to that of a sharp corner (e.g. a shape having a sharp angle shown in FIG. 9). When a peripheral flank of an end mill is worked, this peripheral flank is not formed or extended into a cutting edge but a cylindrical ground surface is left between the cutting edge and the peripheral flank. The term "circular land" indicates this cylindrical ground surface.

In order to prevent the aforementioned inconvenience, a circular land 3 may be provided to cover a negative relief face 6, as shown in the comparative example of FIG. 11. A hard sintered compact 1 forming an insert portion is bonded to a surface of a tool body 2. FIG. 11 is a schematic diagram as viewed from the side of a peripheral flank 4.

In such a structure, however, the circular land 3 must have a width $\underline{h}$ of at least Wtanδ mm, assuming that W represents the width of the negative relief face 6 and δ represents the helix angle. When the width $\underline{h}$ of the circular land 3 is increased in order to cover the negative relief face 6, then the friction between the circular land 3 and a working surface is so increased that a degree of slanting or the like is caused on a side surface of a work surface, which leads to such new inconvenience that excellent cutting performance cannot be attained.

When a circular land 3 having a width $\underline{h}$ which is smaller than the width Wtanδ of the negative relief face 6 is provided in an ordinary comparative configuration as shown in FIG. 12 considering that the cutting resistance is reduced as the width $\underline{h}$ of the circular land 3 provided on the peripheral cutting edge portion is reduced, on the other hand, the circular land 3 is disadvantageously broken or interrupted and thus not present by a width T on the front return part 6. If no circular land 3 is formed on the negative relief face 6, the tool diameter is reduced in this negative relief face 6 as hereinabove described. Consequently, it is difficult to approximate the shape of the corner of the work surface to that of a sharp corner.

When no negative relief face is provided for approximating the shape of the corner of the work surface to that of a sharp corner, however, the front edge may be chipped as hereinabove described.

When stage working is performed by a spiral end mill having an insert portion made of a hard sintered compact which is excellent in wear resistance with a high helix angle, it is difficult to approximate the shape of the corner of the work surface to that of a sharp corner while attaining excellent cutting performance, as hereinabove described.

SUMMARY OF THE INVENTION

An object of the present invention is to provide a spiral end mill which can approximate the shape of a corner of a work surface to that of a sharp corner while attaining excellent cutting performance.

Another object of the present invention is to provide a method of manufacturing a spiral end mill which can readily form a spiral end mill capable of approximating the shape of a corner of a work surface to that of a sharp corner.

The present invention has been made in consideration of the following point. With increases in the difficulty of cutting workpieces and in the sophistication of applications, a spiral end mill which is made of a hard material mainly composed of diamond or CBN is strongly required. Particularly relating to the sophistication of applications, tool accuracy that does not allow small steps or corner chamfers as shown in FIGS. 7 and 8 is required in recent years. In particular, it has recently been proved that even an extremely small step exerts a remarkable influence on the performance of the product in a mold or a fluid carrier for which accuracy is required. Thus, the present invention has been proposed in order to solve such problems.

According to a first aspect of the present invention, a spiral end mill comprises a hard sintered compact which is arranged on its insert portion and a negative relief face having a chamfer for reducing the angle of an axial rake which is provided on the front end of the insert portion. This spiral end mill comprises first and second circular land portions. The first circular land portion is provided to have a substantially constant first width along an outer peripheral portion of the insert portion excluding the negative relief face. On the other hand, the second round or circular land portion has a substantially constant second width, and is provided on the outer peripheral portion of the negative relief face of the insert portion to be continuous with the first circular land portion so that a helix angle of a line which is defined by the second circular land portion relative to a peripheral flank is smaller than the helix angle of the first circular land portion. Preferably, the width (W) of the negative relief face may be set in the range of at least 0.05 mm and not more than 0.5 mm.

In this spiral end mill according to the first aspect of the present invention, the second circular land portion, which, along its intersection with the peripheral flank, defines a line having a helix angle which is smaller than that of the first circular land portion, is formed on the outer peripheral portion of the negative relief face of the insert portion to be continuous with the first round or circular land portion which is provided along the outer peripheral portion of the insert portion excluding the negative relief face, whereby the negative relief face is prevented from reduction of the tool diameter. Thus, a corner of a work surface is finished in a shape which is close to that of a sharp corner. When the width (W) of the negative relief face is set in the range of at least 0.05 mm and not more than 0.5 mm, initial chipping in cutting is prevented and cutting noise is not increased.

According to a second aspect of the present invention, a method of manufacturing a spiral end mill comprises the step of changing the widths of circular lands which are formed on an outer peripheral portion of an insert portion excluding a negative relief face and that of the negative relief face at the time of working a relief angle on the outer periphery of the insert portion by changing helix angles between the outer peripheral portion of the insert portion excluding the negative relief face and that of the negative relief face. Preferably, the width (W) of the negative relief face may be set in the range of at least 0.05 mm and not more than 0.5 mm.

In this method of manufacturing a spiral end mill according to the second aspect of the present invention, the widths of the circular lands which are formed on the outer peripheral portion of the insert portion excluding the negative relief face and that of the negative relief face are changed at the time of working a relief angle on the outer periphery of the insert portion by changing the helix angles between the outer peripheral portion of the insert portion excluding the negative relief face and that of the negative relief face, whereby the circular land portions of the outer peripheral portion excluding the negative relief face and that of the negative relief face are readily formed with different widths. Further, the work surface can be more excellently finished when the width (W) of the negative relief face is set in the range of at least 0.05 mm and not more than 0.5 mm.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a schematic diagram showing a tool profile model according a comparative example provided with a negative relief face but with no circular land;

FIGS. 5A and 5B are schematic diagrams showing tool profile models according to embodiments of the present invention having negative relief faces and circular lands provided on the outer peripheries of insert portions and on the negative relief faces;

DESCRIPTION OF THE PREFERRED EMBODIMENTS

Figure 1:
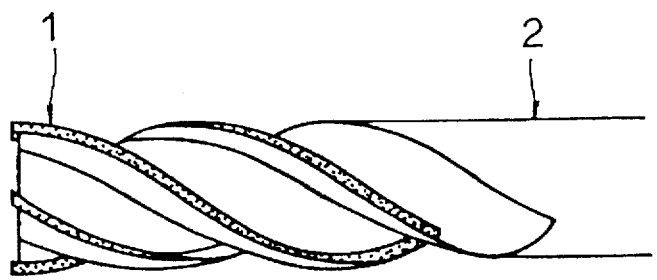
FIG. 1 is a side elevational view showing a basic shape of a spiral end mill having an insert portion made of a hard sintered compact.
Figure 2:
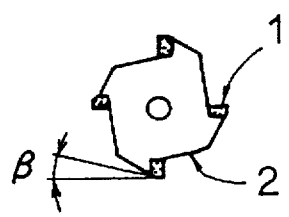
FIG. 2 is a front elevational view of the spiral end mill shown in FIG. 1.

Referring to FIGS. 1 and 2, a hard sintered compact 1 is bonded to an insert portion of a tool body 2.

Figure 3:
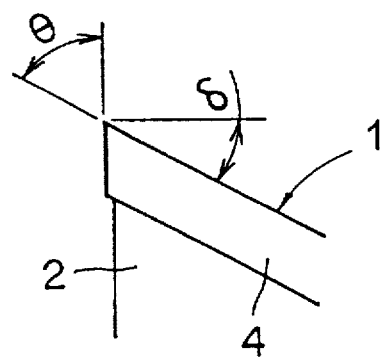
FIG. 3 is a schematic diagram showing a tool profile model according to a comparative example provided with no negative relief face, having a peripheral cutting edge portion formed in a sharp corner.

When a spiral end mill having such an insert portion of the hard sintered compact 1 is set at a high helix angle δ (see FIG. 11) of 15° to 45°, for example, the forefront wedge angle θ is reduced and the edge angle is sharpened, as shown in FIG. 3. When the insert portion is made of the hard sintered compact 1, therefore, a negative relief face 6 which is chamfered for setting or approximating an axial rake at or to 0°, for example, is generally provided on the forefront portion as shown in FIG. 4, in order to prevent the forefront edge from chipping. When such a negative relief face 6 is provided, however, the tool diameter is disadvantageously reduced on this negative relief face 6 and hence the shape of a corner of a work surface being milled by the spiral end mill cannot be approximated to that of a sharp corner as described above. In order to eliminate this inconvenience, the spiral end mill according to the present invention has a first circular land 3a with a width h provided on an outer peripheral portion of an insert portion consisting of a hard sintered compact 1 and a second circular land 3b with a width H greater than the width h provided on a negative relief face 6 to be continuous with the first circular land 3a, as shown in each of FIGS. 5A and 5B. Due to such provision of the second circular land 3b, which is obtained by changing the width h of the circular land 3a provided on the outer peripheral portion to the width H on the negative relief face 6, the circular lands 3a and 3b remain continuous on the overall region of the insert portion.

Figure 14A:
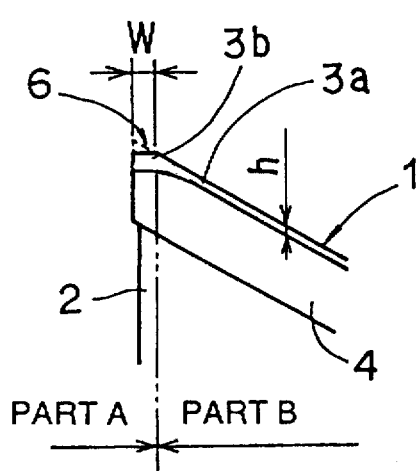
FIGS. 14A and 14B are schematic diagrams showing tool profile models according to other embodiments of the present invention.
Figure 14B:
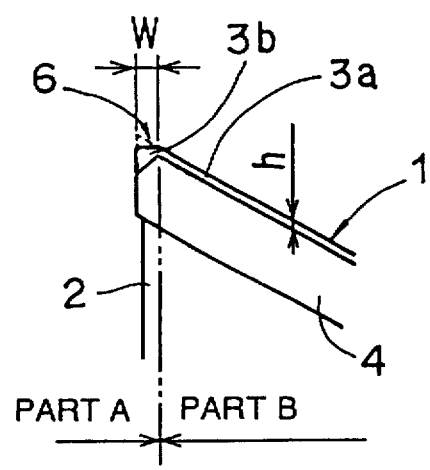

It is possible to provide the circular lands 3a and 3b according to the present invention shown in each of FIGS. 5A and 5B by changing a helix angle from the negative relief face 6 (part A) toward the peripheral cutting edge portion (part B) in each of FIGS. 5A and 5B when a radial relief β (see FIG. 2) generally having an angle of 5° to 30° is subjected to lead working. Namely, the part A is lead-worked at a helix angle which is identical to or close to a front return axial rake angle, while the part B is lead-worked at a helix angle along the cutting edge, similarly to an ordinary spiral end mill. The width h of the circular land 3a is preferably not more than 0.15 mm and at least 0.01 mm. If the width h exceeds 0.15 mm, the cutting resistance is increased and the cutting face is waved to cause extreme difficulty in manufacturing of the tool. More preferably, the width h of the circular land 3a is not more than 0.1 mm, in order to reduce the cutting resistance. The circular lands 3a and 3b according to the present invention may be shaped as shown in FIGS. 14A and 14B, in place of the shapes shown in FIGS. 5A and 5B. As shown in FIG. 14A, the lead-working angle may transition smoothly from that of the part A to that of the part B, or as shown in FIG. 14B the lead-working angle may have a sharp transition between part A and part B, whereby the lead-working angle for the part A may diverge from that of the part B even more than or beyond the front return axial rake angle.

Figure 6:
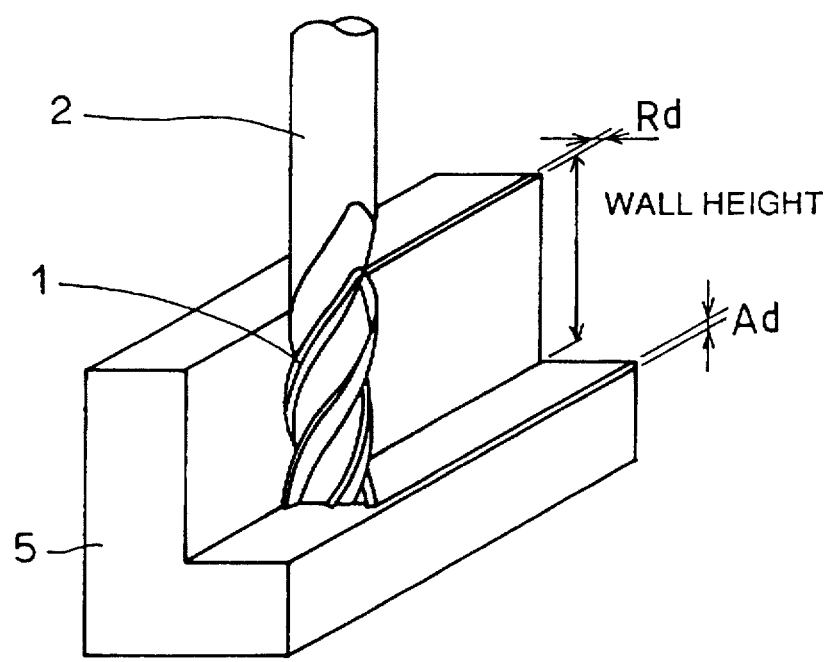
FIG. 6 is a perspective view for illustrating a cutting step carried out by a spiral end mill having an insert portion made of a hard sintered compact.

Description is now made on results of a test for actual cutting shown in FIG. 6 with tools shown in FIGS. 3, 4, 5A, 5B, 11 and 12. The shapes of the tools shown in FIGS. 3 to 5B, 11 and 12 are first described.

In the tool according to the comparative example shown in FIG. 3, the peripheral cutting edge was formed in a sharp corner, with no provision of a negative relief face on the forward end. The term "sharp corner" indicates a cutting edge which is formed by driving or extending a flank into the cutting edge and rounding up the same while leaving no negative relief face in working.

In the tool according to the comparative example shown in FIG. 4, the peripheral cutting edge was formed in a sharp corner, while providing the negative relief face 6 on the forward end by a width W of 0.2 mm.

In the tool according to the embodiment of the present invention shown in FIG. 5A, the negative relief face 6 was provided on the forward end by a width W of 0.2 mm, while the circular lands 3a and 3b having widths h and H of 0.02 mm and 0.1 mm were provided on the peripheral cutting edge portion and the outer periphery of the negative relief face 6 respectively.

In the tool according to another embodiment of the present invention shown in FIG. 5B, the negative relief face 6 was provided on the forward end by a width W of 0.2 mm, while the circular lands 3a and 3b having widths h and H of 0.02 mm were provided on the peripheral cutting edge portion and the outer periphery of the negative relief face 6 respectively.

Figure 11:
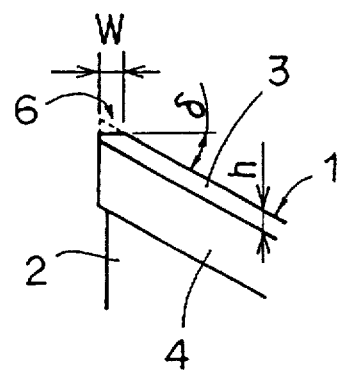
FIG. 11 is a schematic diagram showing a tool profile model according to a comparative example provided with a negative relief face while leaving a circular land with a large width for covering the negative relief face.

In the tool according to the comparative example shown in FIG. 11, a negative relief face 6 was provided on a forward end by a width W of 0.2 mm, and a circular land 3 having a width h of 0.3 mm was provided on a peripheral cutting edge portion. Namely, the width h of the circular land 3 was increased for covering the negative relief face 6 with the circular land 3, thereby suppressing reduction of the tool diameter.

Figure 12:
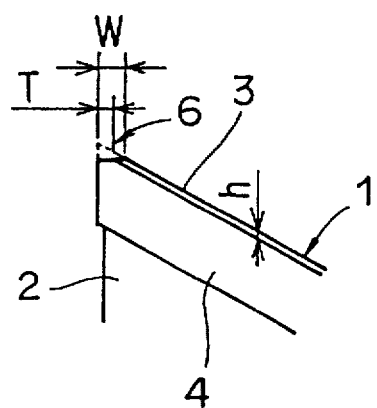
FIG. 12 is a schematic diagram showing a tool profile model according to a comparative example provided with a negative relief face while leaving a circular land that is broken or discontinued on the negative relief face due to its constant relatively narrow width.

In the tool according to the comparative example shown in FIG. 12, a negative relief face 6 was provided on a forward end by a width W of 0.2 mm, and a circular land 3 having a width h of 0.3 mm was provided on a peripheral cutting edge portion. The circular land 3 was broken or discontinued on the negative relief face 6 due to the conventional working method.

Samples of the aforementioned tools according to the present invention and the four comparative examples were prepared and thereafter subjected to cutting as shown in FIG. 6 under the following conditions:

EXAMPLE 1

In relation to each sample, a four-flute end mill, provided with an insert portion consisting of sintered diamond, having a tool diameter of 8 mm and an insert portion helix angle of 30° was employed for cutting a workpiece of an aluminum alloy containing 10 percent by weight of Si under the following conditions:

Speed of Rotation: N=20000 rpm

Feed: F=1000 mm/min.

Radial Depth of Cut: Rd=0.05 mm

Axial Depth of Cut: Ad=0.05 mm

Wall Height: 15 mm

Type: wet cutting with water-miscible cutting liquid

The results of cutting under the aforementioned conditions are now described.

In the comparative tool shown in FIG. 3, the forward end of the insert was chipped with a cutting distance of 1 to 2 m.

The comparative tool shown in FIG. 11 became unusable in an initial stage due to large side slanting degree and slanting degree.

Figure 7:
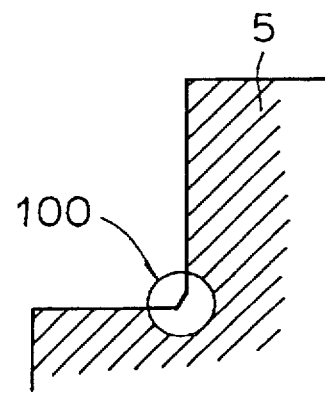
FIG. 7 is a sectional view showing the shape of a work surface cut by the tool profile model according to the comparative example shown in FIG. 4 or 12.
Figure 8:
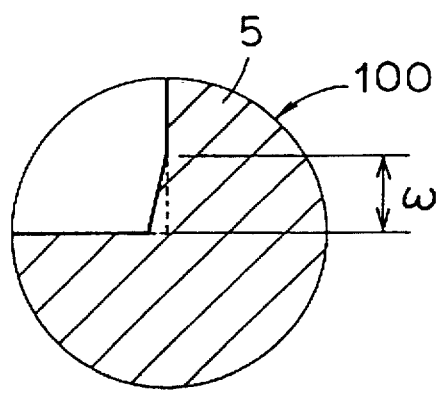
FIG. 8 is a partially enlarged view of a corner portion 100 of the work surface shown in FIG. 7.
Figure 9:
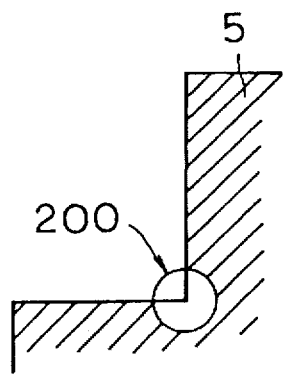
FIG. 9 is a sectional view showing the shape of a work surface cut by the inventive tool profile model shown in FIG. 5A or 5B.
Figure 10:
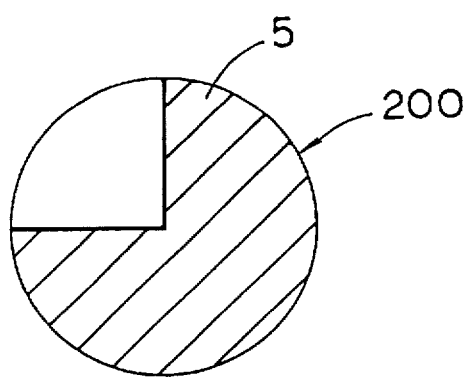
FIG. 10 is a partially enlarged view of a corner portion 200 of the work surface shown in FIG. 9.

In each of the comparative tools shown in FIGS. 4 and 12 and the inventive tools shown in FIGS. 5A and 5B, the cutting edge was not chipped and excellent results were attained as to side slanting degree and slanting degree after working over a cutting distance of 1000 m. As shown in FIGS. 7 and 8, however, a step w shown in FIG. 8 was formed in a corner portion of the aluminum alloy workpiece 5 by the front return width W in the comparative tool shown in FIG. 4. Also in the comparative tool shown in FIG. 12, the circular land 3 was broken or interrupted and discontinued by the front return and the step w shown in FIG. 8 was formed by the width T shown in FIG. 12 due to reduction of the tool diameter. In the inventive tools shown in FIGS. 5A and 5B, on the other hand, it was possible to obtain right-angle shapes, i.e., shapes close to those of sharp corners, in corner portions as shown in FIGS. 9 and 10 respectively. The radius (R) of the corner portions remained substantially unchanged also after working over 1000 m.

EXAMPLE 2

Results of evaluation of cuttability or cutting character in relation to circular land widths h are now described. Samples of the inventive tool shown in each of FIG. 5A and 5B were prepared with four types of circular lands 3a having widths h of (1) 0.05 mm, (2) 0.1 mm, (3) 0.15 mm and (4) 0.2 mm, and subjected to evaluation of cutting states and side working accuracy. Workpieces were prepared from an aluminum alloy containing 5 percent by weight of Si, and cut under conditions similar to those of Example 1. Table 1 shows the results of the evaluation.

TABLE 1

| No. | ① | ② | ③ | ④ |
|---|---|---|---|---|
| Width of Circular land | 0.05 mm | 0.1 mm | 0.15 mm | 0.2 mm |
| Side Working Accuracy | Slanting Degree 3 μm | Slanting Degree 6 μm | Slanting Degree 12 μm | Slanting Degree 17 μm |
| Cutting State | excellent with stable cutting | stable cutting (cutting noise somewhat larger than ①) | occasionally chattered but was capable of cutting | chattered and was incapable of cutting (chatter marks on working surface) |

Referring to Table 1, it is understood that it is possible to attain stable cutting when the width h of the circular land 3a is not more than 0.1 mm. If side working accuracy is not much required, however, cutting is also possible with the width h of 0.15 mm at the maximum.

EXAMPLE 3

Samples of the tool shown in FIG. 5A were prepared to study the widths H and W of the circular land 3b and the negative relief face 6. The samples of the tool shown in FIG. 5A were employed to work workpieces of an aluminum alloy containing 20 percent by weight of Si, and subjected to evaluation of cutting states and states of finished surfaces under conditions similar to those of Example 1, except that the widths H of the circular lands 3b were (1) 0.02 mm, (2) 0.1 mm, (3) 0.3 mm and (4) 0.5 mm while the widths W of the negative relief faces 6 were (1) 0.03 mm, (2) 0.05 mm, (3) 0.1 mm, (4) 0.2 mm, (5) 0.4 mm and (6) 0.5 mm.

Figure 13:
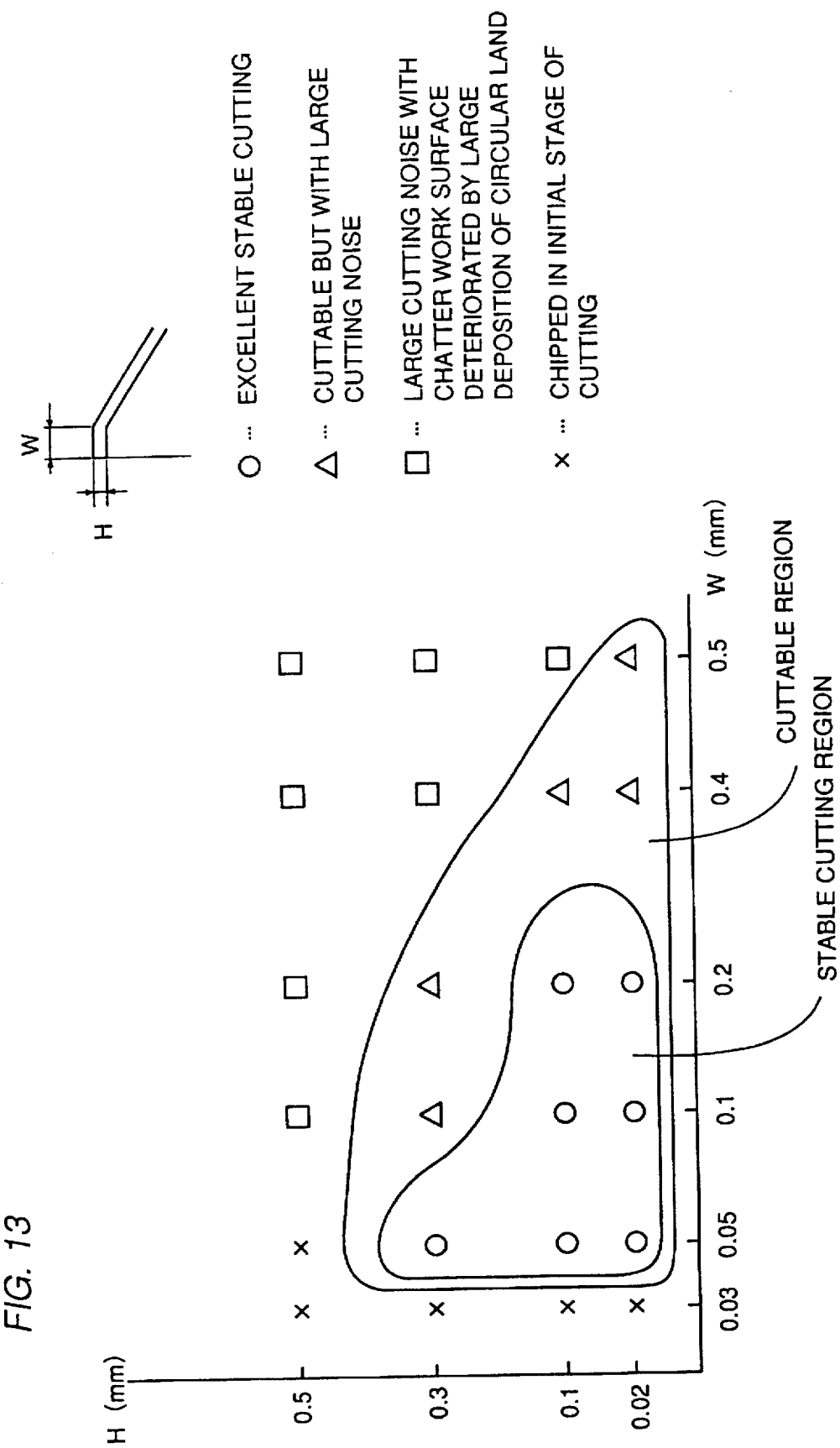
FIG. 13 illustrates the cutting performance of spiral end mills obtained in Example 3 with widths H and W shown on the axes of ordinates and abscissas respectively.

FIG. 13 shows the results of the cutting test with the aforementioned parameters. Referring to FIG. 13, it is understood that the tool is capable of cutting when the width H of the circular land 3b is not more than 0.3 mm, and cutting resistance is reduced as the width H is reduced. Considering this point, it can be said that the width H of the circular land 3b is preferably set in the range of at least 0.01 mm and not more than 0.3 mm. If the width H exceeds 0.3 mm, a chatter is caused and the cutting noise is increased, while the circular land 3b becomes deposited to deteriorate the state of the work surface. If the width H is less than 0.01 mm, on the other hand, control is unpractically made difficult on the technique of manufacturing the tool. Therefore, the width H of the circular land 3b is preferably at least 0.01 mm and not more than 0.3 mm.

As to the width W of the negative relief face 6, the tool is capable of cutting when the width W is at least 0.05 mm and not more than 0.5 mm, and this width W is preferably not more than 0.4 mm, as shown in FIG. 13. Further, the width W is preferably increased in consideration of the cutting edge strength if stable cutting is attained, and preferably at least 0.1 mm in general. In consideration of the aforementioned points, the width W of the negative relief face 6 is preferably set in the range of at least 0.05 mm and not more than 0.5 mm. Initial chipping is easily caused in cutting if the width W is less than 0.05 mm, while the cutting noise is disadvantageously increased if the width W exceeds 0.5 mm. In the spiral end mill according to the present invention, the width W is more preferably set in the range of at least 0.1 mm and not more than 0.4 mm.

In the spiral end mill according to the first aspect of the present invention, the corner of the work surface can be finished in a shape which is close to that of a sharp corner by providing the first and second circular lands on the overall region of the insert portion from the outer periphery to the negative relief face, even if the negative relief face is provided on the forward end of the insert portion. Further, the hard sintered compact which is excellent in wear resistance is employed as the insert portion, whereby shape accuracy of the corner portion can be stably ensured over a long time as compared with the conventional end mill consisting of cemented carbide or high-speed steel. When the inventive spiral end mill is applied to a production line, therefore, the number of tool exchange times can be reduced and hence the production efficiency can be improved.

In the method of manufacturing a spiral end mill according to the second aspect of the present invention, the circular lands can be provided on the outer peripheral portion of the insert portion excluding the negative relief face and that of the negative relief face at the time of working a relief angle in the outer periphery of the insert portion by changing the helix angles between the outer peripheral portion excluding the negative relief face and that of the negative relief face. Consequently, it is possible to readily form a spiral end mill which can approximate the shape of a corner of a work surface to that of a sharp corner.

Although the present invention has been described and illustrated in detail, it is clearly understood that the same is by way of illustration and example only and is not to be taken byway of limitation, the spirit and scope of the present invention being limited only by the terms of the appended claims.

What is claimed is:

1. A spiral end mill having a hard sintered compact being arranged on an insert portion of said spiral end mill and a negative relief face having a chamfer for reducing the angle of an axial rake being provided on a forward end of said insert portion, said spiral end mill comprising:

a first circular land portion being provided along an outer peripheral portion of said insert portion excluding said negative relief face to have a substantially constant first width; and a second circular land portion, having a substantially constant second width, being provided on an outer peripheral portion of said negative relief face of said insert portion to be continuous with said first circular land portion;

wherein a helix angle of a line being defined by said second circular land portion and a peripheral flank is smaller than that of said first circular land portion; and wherein said negative relief face has a width in the range of at least 0.05 mm and not more than 0.5 mm.

2. The spiral end mill in accordance with claim 1, wherein said first width of said first circular land portion is at least 0.01 mm and not more than 0.15 mm, and said second width of said second circular land portion is at least 0.01 mm and not more than 0.30 mm.

3. A spiral end mill comprising a tool body and a hard sintered compact insert bonded to said tool body, wherein said insert has a helical outer peripheral edge extending substantially along said insert, a forefront edge at a forward axial end of said insert, a negative relief face adjacent and interposed between said forefront edge and said outer peripheral edge, a first circular land having a substantially constant first width and extending adjacently along said helical outer peripheral edge, and a second circular land having a second width and extending adjacently along said negative relief face uninterrupted and continuous with said first circular land.

4. The spiral end mill in accordance with claim 3, wherein said insert further has a peripheral flank extending therealong adjacent said first circular land opposite said helical outer peripheral edge and adjacent said second circular land opposite said negative relief face, and wherein a line defined by an intersection of said second circular land with said peripheral flank extends at a helical angle less than a helix angle of said first circular land.

5. The spiral end mill in accordance with claim 3, wherein said insert further has a peripheral flank extending therealong adjacent said first circular land opposite said helical outer peripheral edge and adjacent said second circular land opposite said negative relief face, and wherein a first line defined by an intersection of said first circular land with said peripheral flank and extending at a first helical angle transitions smoothly through a curved line into a second line defined by an intersection of said second circular land with said peripheral flank and extending at a second helical angle less than said first helical angle.

6. The spiral end mill in accordance with claim 3, wherein said insert further has a peripheral flank extending therealong adjacent said first circular land opposite said helical outer peripheral edge and adjacent said second circular land opposite said negative relief face, wherein a first line defined by an intersection of said first circular land with said peripheral flank transitions abruptly at an intersection point into a second line defined by an intersection of said second circular land with said peripheral flank, and wherein said first and second lines respectively extend at first and second helical angles that are different from each other.

7. The spiral end mill in accordance with claim 6, wherein said second helical angle is of opposite helical direction relative to said first helical angle.

8. The spiral end mill in accordance with claim 3, wherein said negative relief face has a width in the range from 0.05 mm to 0.5 mm.

9. The spiral end mill in accordance with claim 8, wherein said width of said negative relief face is in the range from 0.1 mm to 0.4 mm.

10. The spiral end mill in accordance with claim 8, wherein said first width is in the range from 0.01 mm to 0.15 mm, and said second width is in the range from 0.01 mm to 0.3 mm.

11. The spiral end mill in accordance with claim 3, wherein said first width is in the range from 0.01 mm to 0.15 mm, and said second width is in the range from 0.01 mm to 0.3 mm.

12. The spiral end mill in accordance with claim 11, wherein said second width is greater than said first width.

13. The spiral end mill in accordance with claim 11, wherein said first and second widths are substantially equal.

14. The spiral end mill in accordance with claim 11, wherein said first width is not more than 0.1 mm.

15. The spiral end mill in accordance with claim 3, having an effective tool diameter that is substantially constant over said helical outer peripheral edge and said negative relief face.

16. The spiral end mill in accordance with claim 3, being so configured as to be able to mill a substantially sharp right angle inside corner in a workpiece along said forefront edge and said negative relief face.

17. The spiral end mill in accordance with claim 3, wherein said insert further has a peripheral flank extending therealong adjacent said first circular land opposite said helical outer peripheral edge and adjacent said second circular land opposite said negative relief face, wherein said peripheral flank is continuous and has a uniform helical configuration along said first circular land and said second circular land.

* * * * *